United States Patent
Wagner

(10) Patent No.: US 9,193,889 B2
(45) Date of Patent: Nov. 24, 2015

(54) PIGMENTED TWO-COMPONENT PROTECTIVE COATING

(75) Inventor: Georg Wagner, Tholey (DE)

(73) Assignee: NTC Nano Tech Coatings GmbH, Tholey (DE)

(*) Notice: Subject to any disclaimer, the term of this patent is extended or adjusted under 35 U.S.C. 154(b) by 158 days.

(21) Appl. No.: 13/825,163

(22) PCT Filed: Sep. 21, 2011

(86) PCT No.: PCT/DE2011/001752
§ 371 (c)(1),
(2), (4) Date: Jun. 4, 2013

(87) PCT Pub. No.: WO2012/041280
PCT Pub. Date: Apr. 5, 2012

(65) Prior Publication Data
US 2013/0253091 A1    Sep. 26, 2013

(30) Foreign Application Priority Data
Sep. 21, 2010 (DE) .......................... 10 2010 046 281

(51) Int. Cl.
*C09D 183/06* (2006.01)
*C08L 83/06* (2006.01)
*C08K 7/00* (2006.01)
*C08K 5/54* (2006.01)
*C08K 5/544* (2006.01)

(52) U.S. Cl.
CPC .............. *C09D 183/06* (2013.01); *C08K 5/54* (2013.01); *C08K 5/544* (2013.01); *C08K 7/00* (2013.01); *C08L 83/06* (2013.01)

(58) Field of Classification Search
CPC ...................................................... C09D 183/06
See application file for complete search history.

(56) References Cited

U.S. PATENT DOCUMENTS

| 4,847,319 | A  | * | 7/1989  | Bandlish ........................ 524/589 |
| 5,952,439 | A  | * | 9/1999  | Morita et al. ................. 525/476 |
| 6,054,546 | A  | * | 4/2000  | Suzuki et al. ................... 528/15 |
| 6,344,520 | B1 | * | 2/2002  | Greene ......................... 525/100 |
| 6,426,147 | B1 | * | 7/2002  | Holzapfel et al. ............ 428/414 |
| 7,776,148 | B2 | * | 8/2010  | Wagner .................... 106/287.13 |
| 2002/0119337 | A1 | * | 8/2002  | Maze et al. .................... 428/553 |
| 2004/0067366 | A1 |   | 4/2004  | Gorczyca |
| 2004/0191555 | A1 | * | 9/2004  | Germano ...................... 428/553 |
| 2007/0213492 | A1 | * | 9/2007  | Mowrer et al. ................. 528/17 |
| 2009/0029173 | A1 |   | 1/2009  | Schramm et al. |
| 2009/0281207 | A1 |   | 11/2009 | Stratton et al. |
| 2010/0298469 | A1 | * | 11/2010 | Kaupp et al. .................. 523/400 |
| 2011/0126980 | A1 | * | 6/2011  | Campbell et al. ............. 156/330 |

FOREIGN PATENT DOCUMENTS

| DE | 19 935 471 A1 | 2/2001 |
| DE | 10 2005 026523 A1 | 12/2006 |
| DE | 603 16 759 T2 | 7/2008 |

OTHER PUBLICATIONS

Technical Data sheet for Silikopon EF, 1 page, no date given.*
Technical Data sheet for Silikophen, Silikoftal and Silikopon, 12 pages, no date given.*
International Preliminary Report on Patentability issued Mar. 26, 2013 in the parent application PCT/DE2011/001752.

* cited by examiner

*Primary Examiner* — Robert S Loewe
(74) *Attorney, Agent, or Firm* — Novak Druce Connolly Bove + Quigg LLP

(57) ABSTRACT

The invention relates to a two-component protective coating comprising mineral pigments, epoxy-siloxane binder component, and aminic hardener. Provision is made here for this coating to consist of initially separate components A and B, where component A comprises
(a1) x wt. % of inorganic pigments,
  where x=30 to 70,
(a2) 10 to 50 wt. % of at least one epoxy-siloxane,
(a3) 0 to 40 wt. % of an organic solvent
and where component B comprises
(b1) at least one aminic hardener and
(b2) optionally at least one organic solvent.

17 Claims, No Drawings

PIGMENTED TWO-COMPONENT PROTECTIVE COATING

The invention relates to the subject matter claimed in the preamble, and concerns accordingly two-component protective coatings which are pigmented.

Protective coatings are known. Their purpose is to protect a substrate provided with the coating against a variety of influences. For example, corrosive attack may be prevented, or protection from long-term soiling may be facilitated by enabling easier cleaning. Generally at the same time the coating is intended to ensure an appealing appearance for the coated area. It may be noted that in the present case protective coatings are also identified as protective coating material and accordingly both terms can be used synonymously.

In order to attain these properties, proposals have already been made to provide protective coatings with pigments, in order for example, to determine the color of the protective coating.

However, not every protective coating can be applied to every substrate; moreover, particular properties are often desirable in terms of processing, such as good capacity for application, sufficiently long stability prior to processing, defined durations between application and curing, etc. Moreover, not least for reasons of cost and protecting the environment, it is frequently desirable to be able to use particular starting materials and to avoid—at least to a large extent—the use of others.

In DE 19 935 471 A1, for the purpose of producing transparent coating materials for polymer surfaces, the synthesis was described of epoxy-siloxanes, by operations of mixing polysiloxanes with epoxy resins, and the composition described is said to be low in solvent and to operate without fillers.

Described in DE 10 2005 026 523 A1 was a method for producing anticorrosion coatings zinc and aluminum as active pigments.

US 2009 0 281 207 describes photocatalytic coats based on epoxy-siloxanes, with accompanying use of anatase particles.

For the encapsulation of electronic components, the intention according to DE 603 16 759 T2 is that organic epoxy resins are combined with silicone resins.

For mineral substrates as well, protective coats are well established. For instance, sandstone walls on old houses are often painted in order to protect them from weathering; on other mineral substrates as well, such as concrete, for example, protective coatings have already been employed, in order, for instance, to achieve protection from graffiti, and so on.

The degree to which target properties such as stability, good processability, substrate adhesion, low costs, etc. can be achieved is often not entirely satisfactory. This is especially true of problem substrates in problem environments, such as the coating of concrete in tunnels, for instance.

In the case of concrete coatings, in accordance with the prior art, the concrete surface is pretreated in a first step with aqueous acrylate solutions (depth primer). The function of these solutions is that of an adhesion promoter between the mineral substrate and the generally organic polymer-based further coatings.

The second and third coats are then formed by white-pigmented, two-component aqueous coating materials based on epoxy resin+amine hardener.

These two coats, which, furthermore, must be applied a number of times in order to obtain sufficient film thickness and hiding power, have the purpose, as well as coloring, of allowing the diffusion of water vapor from the concrete to the outside (breathability), on the one hand, and the intention, on the other hand, is that a sufficient diffusion barrier against the passage of carbon dioxide to the concrete is to be largely avoided, since otherwise the concrete breaks down over time as a result of carbonatization.

If a better cleaning effect is to be achieved, a hydrophobically formulated polyurethane clearcoat layer is applied as the fourth coat. The cleaning of hydrophobic coats of this kind, however, necessitates the use of high-pressure cleaners and the use of cleaning substances which comprise surfactants.

It is nevertheless desirable for just the simple use of water to lead to very good cleaning behavior. The conventional coats do not ensure this. For instance, a polyurethane coat after cleaning tends to give an impression of the dirt only having been uniformly distributed and having been smeared.

The applicant has already made available a single-coat coating material. That coating material constitutes a 2C (2-component) polysiloxane-polyether single-coat coating material which on the evidence of publicly available information is a sol-gel-based coating material having the following properties: low dry film thickness, very easy-to-clean surfaces, mechanically resistant one-coat coating with good adhesion, curing even at low temperatures, very good adhesion even to mineral substrates, good carbon dioxide imperviousness (SD value for carbon dioxide >66 m), good water vapor diffusion capacity (SD value: water vapor <4 m). On the evidence of the publically available information, the coating material is said also to offer very good gloss retention and weathering resistance, very good resistance to acidic and alkaline attack, and very good water resistance and solvent resistance. Soiled surfaces are said to be readily cleanable with water. Steam jet cleaning, with the associated risk of contamination by aerosol contaminants and microorganisms, is supposed to be unnecessary.

It is said to be supplied in two-component form, specifically in white, with other shades being available on request, and produces a satin gloss appearance.

Moreover, the applicant also knows of a polysiloxane-polyether resin having a solids weight >95% and a density of approximately 1.5 $g/cm^3$ (mixture), with a coverage of approximately 3 to 5 $m^2$/kg at a dry film thickness of 60 μm. Practical use is said to be dependent on the surface roughness and on the application method; the temperature resistance is said to range from −20° C. to +150° C. The shelf life is said to be at least 6 months on storage under cool and dry conditions in sealed original containers. Processing is said to be guided by the material that is to be coated. Preparation, however, presupposes that surfaces must in every case be free from dirt and grease and able to accept a load. The mixing ratio quoted for stock coating to hardener is 6.0:1 with hardener HO2. Air spraying, brush application, and rolling are said to be possible, and it is stated that dilution is possible with alcohols, ketones, and glycol ethers. In the case of high absorbent substrates, an undercoat with dilute material is said to be advisable (approximately 8%-10%). For drying, curing at room temperature is specified, with the pot life being four hours (25° C.), drying (25° C.) taking five hours (to dust-dry), and through-drying (25° C.) taking 24 hours. The target film thickness quoted is about 60 to 100 μm after curing. The values quoted are said to be guideline values and not to possess the meaning of a legal assurance of particular properties on the part of the products. The product information cited is therefore to be considered nonbinding.

Concerning products of the applicant, it has also been reported that a first product was brought to production-ready state that is intended, on the basis of its outstanding properties, to replace conventional tunnel coatings (for example, 2C epoxy dispersions). The product is described as a 2C polysiloxane-epoxy single-coat coating material which in initial, realistic trials is said to fulfill the following objectives: improving safety in road tunnels by reducing soiling and darkening of the tunnel walls; improving the optical properties; and constant reflection properties.

Further assertions include reduction in maintenance costs through improvement in cleaning properties, high resistance toward abraded material from tires and toward soot and salt grit, high scratch resistance, and an improvement in hydrophobic properties; in a variety of trial series, the products, on concrete surfaces, were tested for their properties, specifically in comparative tests with regular market products. In these trials, particular focal points of investigation were soil attachment and cleanability. The following steps were carried out: production of comparative specimens, testing and comparison of mechanical properties, testing and comparison of soil acquisition, and testing and comparison of cleaning properties. The applicant product was established as the most suitable product.

This product is described as being a 2C polysiloxane-epoxy single-coat coating material, with the following product description: It is a sol-gel-based coating material having the following properties: 2C coating, single-coat coating material with low dry film thickness, producing easy-to-clean surfaces and mechanically resistant single-coat coatings with good adhesion. It is said to be curable at low temperatures and in particular at high atmospheric humidities (>90%), to adhere very well to a variety of substrate materials (mineral substrates, metals, glass, polymers, etc.), and to be resistant toward numerous organic solvents, and also to be chromate-free and lead-free for the purposes of German law on hazardous materials. As regards areas of application, it is said that it possesses very good gloss retention and weathering resistance and affords good cleanability of the surface. It is said to be highly resistant to acidic and alkaline attack and to have very good water resistance and solvent resistance, being suppliable with two components in a white shade and in other shades on application. It is said to have a satin gloss appearance, the binder basis quoted being a polysiloxane-epoxy resin having a solids weight of >95% t. Practical use is identified as being dependent on surface roughness and on application characteristics (approximately 0.25 to 0.3 kg/m$^2$); temperature resistance is said to be from −20° C. to +150° C., with a shelf life of at least 6 months on storage under cool and dry conditions in sealed original containers. With regard to processing it is noted that surface preparation is guided by the material that is to be coated, and in any case the surface must be grease-free and dirt-free and able to accept a load. The mixing ratio quoted is a ratio of stock coating to hardener of 7.5:1.

Processing is said to be possible by air spraying, brush application, and rolling, with dilution with alcohols, ketones, and glycol ethers. With regard to drying it is noted that the product cures at room temperature and that, when dust-dry, it can be baked at temperatures above 60° C. The pot life is said to amount to five hours (25° C.), the drying times (25° C.) to five hours (dust-dry), with ten hours for through-drying (25° C.). The system is referred to as moisture-curing and hence to be applicable even when there is high atmospheric humidity and high substrate moisture content. The target film thickness is said to amount to approximately 100 μm after curing, and is applied in one operation in this film thickness. The values specified above are set here, again, to the guide values.

There is reference to the fact that the product meets the usual standards required in tunnel construction. In particular, very good values are said to be achieved inter alia in terms of water vapor diffusion flow density in accordance with SN EN ISO 7783-2 and carbon dioxide diffusion flow density in accordance with SN EN 1062-6.

In the fall of 2007, a field trial with four applications was carried out in the Zingel tunnel as well. These trial surfaces have since been inspected a number of times, and have already been cleaned. Practical examination of adhesion and resistance, cleaning and maintenance, environmental conditions and coating conditions, and determination of the consumption of material in practice, are already showing a very robust and easy-to-clean surface with optimum optical properties, in spite of difficult application conditions (4° C. to 6° C. in rainy weather).

A further paint test was then initiated in June 2009 in order to verify whether new coating products were suitable for use in high-traffic road tunnels. This paint test had still not been concluded on the filing date.

Against this technological background, it is desirable to specify further coatings which are suitable for mineral substrates; for mineral substrates the intention in particular is to specify a two-component protective coating which is pigmented.

It is further desirable to specify a substance in the form of a pigmented two-component protective coating for—for example—mineral substrates, and the method for its production.

The object of the present invention is to provide new material for industrial application.

The achievement of this object is claimed in independent form. Preferred embodiments are found in the dependent claims.

In accordance with a first essential aspect of the invention, therefore, a two-component coating material is proposed which has plateletlike inorganic pigments and fillers, inorganic and/or organic, color-imparting pigments, epoxy-siloxane binder component, and aminic hardener, wherein the two-component protective coating material comprises two initially separate components A and B, where component A comprises (a1) x wt. % of inorganic pigments,
    where x=30 to 70,
(a2) 10 to 50 wt. % of at least one epoxy-siloxane,
(a3) 0 to 40 wt. % of an organic solvent
and where component B comprises
(b1) at least one aminic hardener and
(b2) optionally at least one organic solvent.

Further proposed is a method for producing a two-component coating material of the invention, that comprises the following steps:

a) introducing 10 to 50 wt. % of epoxy-siloxane,
b) homogeneously mixing x wt. % of the plateletlike inorganic pigments, where x=5 to 30, and y wt. % of the color-imparting organic and/or inorganic pigments, where y=10 to 30, with the epoxy-siloxane, to provide component A, and
c) introducing aminic hardener and optionally organic solvent, to provide component B.

It is also proposed that a method for producing a two-component coating material is provided by combining component A and component B with one another.

The two-component protective coating material of the invention therefore comprises inorganic pigments and fillers which possess a plateletlike structure. The advantage of these platelet-shaped fillers is to extend the diffusion pathway. This extends the path taken by carbon dioxide, which penetrates into the coating from the exterior, to the coated material, with a consequence that the fillers do not serve just for pigmentation, but instead the pigments as well alter the properties particularly at locations where the coated material is sensitive to carbon dioxide and where considerable loads of carbon dioxide occur in the surroundings. The coating material of the present invention is therefore suitable particularly for tunnels, especially those with concrete walls. The platelets are then in the form of layers in the cured coating material.

It has emerged that preferably at least 5 and preferably not more than 30 wt. % of plateletlike inorganic pigments or fillers ought to be present in the two-component coating of the invention.

If more than 30 wt. % are used, this does not in fact adversely affect the desired protective effect; however, problems may possibly occur if the desire is to formulate a relatively dark shade, since the fillers also possess a white effect. Less than 5 wt. %, in contrast, can no longer be regarded as sufficient to reliably achieve a better protective effect under all conditions. In accordance with the invention at least 10 to 30 wt. % of the color-imparting organic and/or inorganic pigments are preferably included.

This range allows a desired shade to be formulated in spite of difficulties which exist. In order to formulate dark shades, the stated 30% of fillers are already too much; often, therefore, a middle path must be selected between possible shades and protective effect.

Preferred for use as platelet-shaped filler is talc, among others. Talc is a term for inorganic minerals from the family of the layered silicates, also phyllosilicates, which consist primarily of magnesium silicate and include various admixtures such as chlorite or other accompanying minerals.

Also suitable are micas, i.e., phyllosilicates in which large cations such as $K^+$, $Na^+$, or $Ca^{2+}$ are installed.

Preference is given to using talc with a composition of 35 to 70 wt. % $SiO_2$, 5 to 40 wt. % MgO, 5 to 20 wt. % $Al_2O_2$, and 1 to 5 wt. % $Fe_2O_3$. Particular preference is given to using lamellar talc having a composition of 40 to 50 wt. % $SiO_2$, 25 to 35 wt. % MgO, 7 to 12 wt. % $Al_2O_3$, 1.5 to 2.5 wt. % $Fe_2O_3$, and 1 to 2 wt. % CaO.

Suitable talc products are sold for example under the trade names Luzenac®, Mistron®, French Velvet®, and Ultrapure Talc®.

Further preferred fillers include calcium carbonates. Calcium carbonates which can be used are those which preferentially occur naturally or have been produced synthetically. These inorganic minerals with the chemical formula $CaCO_3$ have an alkaline pH and a low oil absorption, at least in so far as natural calcium carbonate is concerned. These properties make calcium carbonates an ideal filler for primers. Calcium carbonate which can be used is available under trade names including that of Omyacarb.

Suitable color-imparting pigments include virtually all organic and/or inorganic pigments which can be technologically employed.

This makes it possible to combine different types of pigment in order to formulate defined shades. The color-imparting pigments need to be used exclusively for coloring, and this makes it possible to employ typical commercial products from various manufacturers and/or prefabricated pigment mixtures with preformulated shades.

Suitable inorganic pigments include titanium dioxide, carbon black, bismuth pigments, Prussian blue, ultramarine, cadmium pigments, and chromate pigments (chromium yellow, chromium green, and molybdates), and also, furthermore, iron oxide pigments, chromium oxide, and mixed-phase pigments (for example, spinel pigments, hematite pigments, inverse spinel pigments, and rutile derivatives).

Preferred organic pigments that may be disclosed include azo pigments (beta-naphthol pigments, naphthol AS pigments, benzimidalolone pigments) or polycyclic pigments (phthalocyanine pigments, quinacridones, diketopyrrolopyrrole pigments, dioxazines, perylenes, isoindolines, and inthanthrones).

Mention may be made of the fact that these materials, when the stock coating component is being produced, must be very thoroughly dispersed and ground, since virtually no solvents are present and it is necessary to employ high gravitational forces.

The plateletlike inorganic pigments and the fillers and also the color-imparting organic and/or inorganic pigments may be added both to the epoxy-siloxane component (component A) and to the aminic hardener (component B), or to both components. In one preferred variant, however, the pigments are added exclusively to the epoxy-siloxane component.

This facilitates the incorporation of the pigments.

Epoxy-siloxanes are polysiloxanes having functional epoxide groups, which comprise at least one polysiloxane having functional epoxide groups, where the polysiloxane framework or the side chain of the polysiloxane framework has preferably OH groups or alkoxy groups, having an epoxy equivalent of at least 200.

Particularly suitable prepolymers are, for example, the substances obtainable under the following trade names: Silikopon EF, Silikoftal ED, and Tegomer Esi 2330 (manufacturer: Evonik Tego Chemie GmbH, 45127 Essen), D.E.R. 337 and D.E.R. 732 (manufacturer: Dow Epoxy Systems). Also suitable are epoxy-siloxanes such as the product Silres HP 1000 from Wacker (Wacker Silicones Division, 3301 Sutton Road, Adrian, Mich. 49221-9397, USA), where phenyl silanes have been oligomerized with epoxy silanes, or Silres HP 2000.

The epoxy-siloxane used is preferably liquid at application temperatures of around 0 to 40° C. Otherwise the addition of solvents may be considered, though for the protective coating of the invention per se, the addition of solvents is to be kept as low as possible.

In the case of the inventive component A, the pigments are dispersed in the preferably liquid epoxy-siloxane, without any need for further solvent to be added. In order to achieve effective dispersing, liquid resin is introduced and the pigments are weighed out and added to the resin. The pigments are stirred in using a dissolver having a stirring disc, with a high shearing action. At this point in time it may be useful to add dispersing additives which improve the wetting of the pigments with the resin.

Component A is preferably completely or at least substantially solvent-free. The solvent fraction preferably amounts in total to 0 to not more than 20 wt. %, preferably 0.5 to 10 wt. %, more preferably from 0.5 to 5 wt. %, and very preferably from 0.3 to 3 wt. %, based on the weight of the total protective coating material or total protective coating.

Whereas in theory a multiplicity of solvents can be employed, ether alcohols, and especially butyl glycol, are preferred. Also very highly suitable are esters such as butyl acetate, for example. Alcohols such as ethanol or isopropanol can be used well from a chemical viewpoint, but in practice have the drawback that they exhibit a low flash point.

Component B comprises substantially at least one aminic hardener or amine hardener. Here it is indeed possible in principle to use all known aminic hardeners. Preferred aminic hardeners, however, are polyamines such as the particularly preferred amines diethylenetriamine, triethylenetetramine, and also cycloaliphatic amines such as, for example, isophoronediamine.

It may be mentioned that organic epoxy resins are intended for additional, accompanying use as an extender in the stock coating. While this does make the product cheaper, advantageously, the properties nevertheless become poorer (slower curing, soft, weaker hydrophobicity, and hence poorer cleanability and also poorer diffusion properties on account of the lower degree of crosslinking).

Particularly preferred as aminic hardeners are aminosilanes such as, for example, 3-aminopropyl-trimethoxysilane or similar derivatives of aminosilanes having one or more amino groups per silane molecule. The advantage of using aminosilanes is in the present case that the alkoxide groups of the silane co-crosslink with the alkoxide groups of the epoxysiloxane in condensation reactions. Commercially available aminosilanes that may be used in accordance with the invention are, for example, silanes produced by Evonik under the trade name "Dynasylan®" or by Momentive under the trade name Silquest® silanes, or the GENOSIL® silanes produced by Wacker. Examples thereof are, for example, aminopropyltrimethoxysilane (Dynasylan AMMO; Silquest A-1110), aminopropyl-triethoxysilane (Dynasylan AMEO), and mixtures thereof.

The amine hardener is used in amounts of 5 to 25 wt. %, preferably of 6 to 20 wt. %, based on the weight of the overall two-component protective coating. This weight range is advantageous since if a small amount of hardener is used, curing is impaired considerably, possibly to the point where there is no longer any curing of the coating at all ("fly glue"). If more hardener is used, then curing still takes place; however, it is likely that the resulting product properties will no longer entirely match those desired.

In the case of a further preferred embodiment, the two-component coating material may additionally comprise further additives such as dispersing assistants, wetting agents, flow control agents, substrate-wetting agents, fillers and/or other binders such as reactive diluents.

As preferred dispersing assistants it is possible to use coatings additives that are customary per se. The amount of additives used is preferably 0 to 5 wt. %, based on the weight of the overall protective coating material.

Preferred fillers which can be used are, in particular, platelet-shaped inorganic fillers such as talc, mica, kaolin, etc. The amount of filler used is preferably 3 to 40 wt. %, more preferably 3 to 25 wt. %.

Talc is not only well established per se in coatings technology, but is also favorably priced. In empirical investigations, the proportions quoted have resulted in good processing properties and in diffusion properties that are advantageous for tunnel construction.

The 2C coating material may be applied to the substrate directly by means, in particular, of brushing, rolling or airless coating. The film thickness of the overall coating thereafter is preferably just 60 to 120 μm, preferably 80 to 100 μm. In the prior art, in contrast, in the case of typical multicoat concrete coatings, significantly higher film thicknesses are customary, entailing a correspondingly increased level of consumption of material.

The invention may be elucidated below, merely by way of example, without any restriction thereon.

INVENTIVE EXAMPLE 1

(Two-component Protective Coating)
Component A:
The following substances were added in succession in a batching vessel to a dissolver with stirring of up to 2000 rpm:

40 g of epoxysiloxane are introduced. The solids fraction is 97.5 to 99.5 wt. %. Added to this are 0.5 g of dispersing additive and 1.5 g of fumed silica. Stirring then took place for a sufficient time to give a fully homogeneous dispersion. Then, in succession, the following are added with stirring:

| | |
|---|---|
| 20 g | titanium dioxide (white pigment) |
| 10 g | platelet-shaped talc (functional filler) |
| 15 g | calcium carbonate (functional filler) |
| 15 g | epoxy-siloxane. |

All of the components were subsequently stirred for 20 minutes more at 1500 rpm.

Component B:
Here, 13.8 g of 3-aminopropyltrimethoxysilane (aminosilane) were used.

While outstanding coatings are already achievable with the invention disclosed above, it is possible to achieve further improvements.

The concrete coating in the existing state is indeed virtually solvent-free, but still contains about 3% of organic solvents. These solvents are "entrained" by virtue of the fact that the additives are solutions. It would be desirable to reduce the solvent content or to specify a composition which makes it easy to employ solvent-free additives.

Indicated below are those additive functionalities that can be realized by suitable agents with a reduced loading from volatile hydrocarbons. It is noted that improvements regarded as patentworthy are already obtained if one individual or a number of individual additive functionalities with reduced loading from volatile hydrocarbons are realized, as disclosed below, without it being necessary at the same time for all of the other additive functionalities below, with reduced loading from volatile hydrocarbons, to be realized. Attention is therefore drawn explicitly to the fact that the use of individual additive functionalities or of additives used for achieving the same will be considered per se to be amenable to claims—possibly in divisional applications—although advantages may arise if a plurality or all of the additive functionalities are realized with a reduced loading from volatile hydrocarbons.

Reducing the solvent content based on volatile hydrocarbons can, however, lead to problems in the case of the processing of the material with a high solids content. In the case of airless spraying in particular, for example, the viscosity is too high for the product still to be processed effectively.

Airless is a spraying process in which viscous coating materials are sprayed with high pump pressure without addition of air. In this way, large quantities of coating material can be processed very rapidly and effectively. Airless application is preferred over roller application, since the latter requires more time, and the paint consumption and resulting film thickness are higher with roller application.

Whereas in principle the viscosity can be lowered so as to produce processability through addition of organic solvents such as, for example, butyl glycol, isopropanol, or butyl acetate, this raises the solvent content of the coating material excessively, and the advantages of the very-high-solids material are lost on account of the high VOC levels, in other words the excessive amount of Volatile Organic Compounds present, thus increasing the burden for the processor, and the risk of explosion. Provided the corresponding burden for processors does not necessitate any additional protective measures and/or there is no risk of explosion and/or no particular eco-protection measures are required on account of the use of volatile hydrocarbons, the amount of volatile hydrocarbons is regarded presently as "low at best".

In order nevertheless to achieve a dilution effect sufficient for airless spraying with a reduced volatile hydrocarbons content, reactive diluents are now used in accordance with the invention. Reactive diluents contemplated are compounds of low viscosity which are able to react chemically with the base material.

Preferred in accordance with the invention are reactive diluents which in terms of their polarity are very readily miscible with epoxy resins. Moreover, preferred reactive diluents possess reactive epoxide groups which are able to react with the amines in the hardener. They are therefore incorporated into the polymer framework and do not pass, as VOCs, into the environment, but instead remain within the coating material in the course of curing and crosslinking.

It is particularly preferred in the present context to use low-viscosity glycidyl ethers of short-chain aliphatic alcohols or alkylphenols as reactive diluents. Typical viscosities in this case are in the range between 5 to 100 mPa s. Typically only small amounts in the range from 1 to 10 wt. % are added to the overall formulation.

Examples thereof are monofunctional glycidyl ethers such as, for example, p-tert-butylphenyl glycidyl ether and C12-C14 glycidyl ethers, and also difunctional or polyfunctional glycidyl ether reactive diluents such as 1,6-hexanediol glycidyl ether, 1,4-butanediol diglycidyl ether, or glycerol triglycidyl ether. Products of this kind are available for example from the company UPPC under the designation Polypox R.

It should be borne in mind here that monofunctional glycidyl ethers lower the degree of crosslinking of the coating, in analogy to chain termination reactions in the case of radical systems. Depending on the amount of reactive diluents added, therefore, according to the invention, the fraction of the amine component in the hardener is adapted (increased) stoichiometrically, accordingly, by determining or estimating a reduction in degree of crosslinking through use of reactive diluent, especially based on a chain termination reaction in the case of radical systems, and performing a hardener adaptation.

Through the use of the reactive diluents in small amounts it is possible to do away entirely with the use of organic solvents.

It is further possible to use additives with reduced VOC content for the purpose of improving the hydrophobicity of the coating, as well.

A typical base formulation exhibits, after curing, a strong hydrophobic effect, and possesses a contact angle of approximately 100° relative to water.

This effect results in strong repulsion of water and in reduced adhesion of oily contaminants to the cured surface. The effect of this is that soiling does not adhere so well and is easy to remove. In service, this means that cleaning intervals are extended, and cleaning itself can take place with low cost and complexity and without surfactant-based cleaners. This effect is therefore highly desirable. In order to achieve it, the formulation is admixed generally with additives which, on account of their high interface activity, migrate to the coating-air interface, where, after curing, they generate strong hydrophobicity and oleophobicity.

Effects of this kind are already known from additives which are based on organosilicones and which are used to improve the cleanability of surfaces—including, for example, as antigraffiti agents.

Conventionally, however, these are used only in the case of polyurethanes. It is presently now proposed that a hydrophobicity additive be used in epoxy systems. For this purpose, in accordance with one particularly preferred variant of the invention, a small amount of isocyanate is added to the stock coating and is able to serve, so to speak, as an anchor group. In the case of this invention, the addition is more preferably made to the hardener component; this is advantageous since an isocyanate is added to the stock coating in order to fix the additive. By adding the additive to the hardener and the isocyanate to the stock coating, the desired reaction takes place only on curing.

One preferred class of hydrophobizing additives are solutions of silicone-modified, OH-functional polyacrylates or polyether-modified, hydroxy-functional polydimethylsiloxanes.

It is known of these additives that they serve for the hydrophobizing of polyurethanes. In this application they have the effect not only of hydrophobizing, but are also firmly chemically incorporated on account of their OH functionality and of the reaction with the isocyanates.

Typical solvents used are, for example, methoxypropyl acetate, the solids content of the additive solution being in the region of 25 wt. %. The OH content of the compounds with acrylic functionality is approximately 30 (reported as mg KOH/g).

The amount of additive solution added is in the range from 3 to 6 wt. %, based on the stock coating+hardener mixture; the optimum lies in the range between 1 to 3%. Where more than 5% is used, the effect does not become any better, and the excess will probably be washed out in the course of use. In practice an amount of 3% has become established.

Commercially available additive products are available from Byk-Chemie in Wesel, under the brand names Byk-Silclean 3700 or -3720.

So that the OH-functional additives are fixed on the coating surface in the polymer assembly, reactive polyisocyanates are added, in accordance with the invention, to the stock coating component or components, these isocyanates docking reactively with the OH component during the process of curing of the coating, thereby fixing the additive to the surface. For this purpose, polyisocyanate solution is used in the range from 1 to 3 wt. % to the stock coating component.

Without the fixing of these additives in the coating matrix, in accordance with the invention, the additive becomes washed out over time and the hydrophobic effect is significantly reduced over the long term.

Polyisocyanates which can be used are oligomeric isocyanates which are typically employed for the preparation of 2C polyurethanes.

The concept, regarded as inventive, of "cutting" epoxy systems with small amounts of isocyanates is accorded particular significance by itself.

Mention may be made of the fact that adducts of TDI (toluene diisocyanate), HDI (hexamethylene diisocyanate), and IPDI (isophorone diisocyanate) can be used with preference for the invention. Additionally it is also possible to use more reactive mixtures of isocyanates, such as, for example, isocyanurate trimers of HDI, biuret of HDI or allophanate of HDI and ethylhexanol.

Since the very reactive aromatic isocyanates are not UV-stable, it is particularly preferred to employ aliphatic polyisocyanates in the case of the present invention, in any case, these aliphatic polyisocyanates being based for example on IPDI or HDI. Typical commercial products are available for example from manufacturers such as Bayer under the trade name Desmodur or from Rhodia as Tolonate, or from BASF under the name Basonat.

For processing, stock coating and hardener are mixed and then applied. Processing may take place within, for example, a maximum of four hours before the product gels (pot life).

After about four hours, the coating surface is dust-dry, and after twelve hours it has dried right through and is load-bearing.

Furthermore and/or additionally it is possible to achieve an at least large reduction in the volatile organic hydrocarbons used for improving the dispersion, in the case of these additives as well.

The purpose of wetting and dispersing additives is to improve pigment wetting and pigment stabilization; accordingly, they prevent or reduce the floating and swimming and also the settling of pigments. The invention now prefers to use fatty acid derivatives as dispersing additives; solvent-free fatty acid derivatives that may be mentioned by way of example include the additive available under the trade name Tego Dispers 652. Further suitable additives that may be disclosed include low molecular weight unsaturated polycarboxylic acid polymers; an example of such a product with an active ingredient content of 99% is Byk-P 105.

Likewise suitable are high-polymer polyurethane polymers. An example of a solvent-free, high-polymer polyurethane polymer with excellent wetting and deflocculating effect is Borchi Gen 0755.

It is further and/or additionally possible, with these additives as well, to achieve an at least large reduction in the volatile organic hydrocarbons which are used as defoamers and/or as deaerating agents.

Additives of these kinds are employed in order to remove unwanted inclusions of air or solvents. The mechanisms of their action are widely described in the prior art; the products are based on solutions of dimethylpolysiloxanes or organically modified polysiloxanes. Silicone-free additives based on organic polymers are also known, but less often employed.

As commercially available products for preferred use, based on an organically modified polysiloxane, mention may be made, for example, of Tego Airex 950 or Baysilone Lack-additiv 3468, which contain 100% of the active ingredient and are free from volatile organic solvents. Silicone-free alternatives without solvent include foam-destroying organic polymers such as, for example, the product Byk A 535 or Borchi Gol E2 from OMG Borchers.

In terms of additives as well that improve the properties of the surface and that lower the surface tension of the coating, it is possible to use those which do not have an adverse effect as a result of a high volatile organic hydrocarbons content. Typically these are silicone additives or organically modified silicone (co)polymers. Examples include, for example, Borchi Gol LA 2 or Baysilone Lackadditiv 3468, in each case with an active ingredient content of 100%.

It is worth noting that the protective coating disclosed not only affords advantages for the coating of (concrete) tunnel pipes but can also be employed diversely, as for example for concrete barriers in road traffic, functional buildings and dwellings, etc., not least under conditions of high UV exposure such as in southerly countries, and so on.

The invention claimed is:

1. A two-component protective coating for a mineral substrate comprising one or more inorganic or organic pigments, or mixtures thereof, and additives, epoxy-siloxane binder component, and aminic hardener, wherein the protective coating comprises initially separate components A and B, where component A comprises:
    (a1) x wt. % of the one or more inorganic and/or organic pigments, where x=30 to 70,
    (a2) 10 to 50 wt. % of at least one epoxy-siloxane,
    (a3) 0 to 40 wt. % of an organic solvent
    and component B comprises
    (b1) at least one aminic hardener and
    (b2) optionally at least one organic solvent
    wherein the additives comprise hydrophobic additives, wherein one component comprises organo-silicone based additives and the other component comprises isocyanate based additives.

2. The two-component protective coating according to claim 1, wherein the organo-silicone based additives are contained in component B and the isocyanate based additives are contained in component A.

3. The two-component protective coating according to claim 2, wherein the organo-silicone based additives are selected from silicone-modified OH-functional polyacrylates or polyether-modified hydroxy-functional polydimethylsiloxanes.

4. The two-component protective coating according to claim 3, wherein the isocyanate additives are aliphatic polyisocyanates.

5. The two-component protective coating according to claim 3, wherein the isocyanate additives are adducts of any one of HDI, IPDI, and TDI.

6. The two-component protective coating as in claim 1, wherein the solvent content of component A is 0 to 20% with respect to the total protective coating weight.

7. The two-component protective coating as in claim 1, wherein the epoxy-siloxane binder component comprises at least one polysiloxane, and the polysiloxane, or a side chain of the polysiloxane, having OH groups or alkoxy groups, have an epoxy equivalent of at least 200.

8. The two-component protective coating as in claim 1, wherein the aminic hardener comprises one or more aminosilanes, the aminosilanes comprising alkoxysilanes having one or more amine groups on one or more alkyl side chains.

9. The two-component protective coating as in claims 1, wherein the aminic hardener comprises one or more organic amines.

10. The two-component protective coating as in claim 1, wherein all or some of the pigments are plateletlike, inorganic and/or oxidic.

11. The two-component coating as in claim 1, wherein the two-component protective coating comprises at least one additive selected from the group of dispersing assistants, wetting agents, flow control agents, and substrate-wetting agents.

12. The two-component coating as in claim 11, wherein the additive is up to a total of 15 wt. %, based in each case on the weight of the overall two-component protective coating.

13. The two-component protective coating according to claim 11, wherein additives are free from any significant amounts of volatile organic hydrocarbons and/or release no volatile hydrocarbons during processing.

14. A concrete protective coating comprised of the two-component protective coating of claim 1.

15. A method comprising applying the concrete protective coating as in claim 14 to tunnel walls made of concrete.

16. A method for producing a two-component protective coating as in claim 1 comprising the following steps:
    a) introducing 10 to 50 wt. % of epoxy-siloxane,
    b) homogeneously mixing 30 to 70 wt. % of the plateletlike inorganic pigments with 10 to 30 wt. % of one or more inorganic or organic pigments, or mixtures thereof, with the epoxy-siloxane and 0 to 5 wt. % of an additive, to provide component A, and
    c) mixing 2 to 15 wt. % of aminic hardener and 0 to 5 wt. % of an additive, to provide component B, and
    d) combining components A and B, wherein the additives comprise hydrophobic additives, wherein one component comprises organo-silicone based additives and the other component comprises isocyanate based additives.

17. A two-component protective coating for a mineral substrate comprising one or more inorganic or organic pigments, or mixtures thereof, and additives, epoxy-siloxane binder component, and aminic hardener, wherein the protective coating comprises initially separate components A and B,
- where component A comprises
  - (a1) x wt. % of the one or more inorganic or organic pigments, or mixtures thereof, where X=15-60,
  - (a2) 10 to 50 wt. % of at least one epoxy-siloxane,
  - (a3) 0 to 40 wt. % of an organic solvent
- and component B comprises
  - (b1) at least one aminic hardener and
  - (b2) optionally at least one organic solvent
- wherein the one or more inorganic or organic pigments, or mixtures thereof, comprises 5 to 30 wt. % of plateletlike inorganic pigments and 10 to 30 wt. % of one or more inorganic or organic pigments, or mixtures thereof, and
- wherein the additives comprise hydrophobic additives, wherein one component comprises organo-silicone based additives and the other component comprises isocyanate based additives.

* * * * *